(12) United States Patent
Razavi

(10) Patent No.: US 7,041,756 B2
(45) Date of Patent: May 9, 2006

(54) CATALYST COMPONENT COMPRISING A METALLOCENE WITH TWO TETRAHYDROINDENYL LIGANDS FOR PRODUCING A POLYOLEFIN

(75) Inventor: Abbas Razavi, Nivelles (BE)

(73) Assignee: Total Petrochemicals Reseach Feluy, Feluy (BE)

( * ) Notice: Subject to any disclaimer, the term of this patent is extended or adjusted under 35 U.S.C. 154(b) by 0 days.

(21) Appl. No.: 10/491,207

(22) PCT Filed: Sep. 26, 2002

(86) PCT No.: PCT/EP02/10941

§ 371 (c)(1),
(2), (4) Date: Sep. 24, 2004

(87) PCT Pub. No.: WO03/029302

PCT Pub. Date: Apr. 10, 2003

(65) Prior Publication Data

US 2005/0020438 A1 Jan. 27, 2005

(30) Foreign Application Priority Data

Sep. 27, 2001 (EP) .................. 01203657

(51) Int. Cl.
C08F 4/52 (2006.01)
C08F 4/76 (2006.01)
B01J 31/00 (2006.01)
C07F 17/00 (2006.01)

(52) U.S. Cl. .............. 526/160; 526/170; 526/943; 526/941; 502/103; 556/53

(58) Field of Classification Search ........... 526/160, 526/150, 243, 170; 556/53; 502/203
See application file for complete search history.

(56) References Cited

U.S. PATENT DOCUMENTS

| | | | | |
|---|---|---|---|---|
| 5,276,208 A | * | 1/1994 | Winter et al. | 556/53 |
| 5,304,614 A | * | 4/1994 | Winter et al. | 526/127 |
| 5,483,002 A | * | 1/1996 | Seelert et al. | 525/240 |
| 5,565,534 A | * | 10/1996 | Aulbach et al. | 526/160 |
| 5,623,022 A | | 4/1997 | Sugano et al. | |
| 5,750,813 A | * | 5/1998 | Hess et al. | 585/12 |
| 5,883,275 A | * | 3/1999 | Bingel et al. | 556/9 |
| 5,914,376 A | | 6/1999 | Herrmann et al. | |
| 6,046,287 A | * | 4/2000 | Galimberti et al. | 526/160 |
| 6,084,043 A | * | 7/2000 | Sugano et al. | 526/127 |
| 6,143,846 A | | 11/2000 | Herrmann et al. | |
| 6,153,549 A | * | 11/2000 | Hubscher et al. | 502/103 |

FOREIGN PATENT DOCUMENTS

| | | | |
|---|---|---|---|
| EP | 643 084 A2 | * | 3/1995 |
| EP | 692 505 A2 | * | 1/1996 |
| EP | 697 418 A1 | * | 2/1996 |

* cited by examiner

Primary Examiner—David W. Wu
Assistant Examiner—Rip A Lee
(74) Attorney, Agent, or Firm—William D. Jackson

(57) ABSTRACT

Provided is a catalyst component for producing a polyolefin, which catalyst component comprises a metallocene catalyst having a structure according to formula (I): $(THI)_2R''MQ_p$, wherein each THI is a tetrahydroindenyl derivative which may be substituted or unsubstituted, provided that at least one of the tetrahydroindenyl derivatives is substituted at the 2-position or the 4-position; R" is a structural bridge to impart stereorigidity between the two THI groups; M is a metal from Group IIIB, IVB, VB or VIB; Q is a hydrocarbyl group having from 1–20 carbon atoms, or a halogen; and p is the valence of M minus 2.

16 Claims, No Drawings

CATALYST COMPONENT COMPRISING A METALLOCENE WITH TWO TETRAHYDROINDENYL LIGANDS FOR PRODUCING A POLYOLEFIN

The present invention relates to a catalyst component and catalyst system for use in preparing polyolefins, especially polyethylene having a high molecular weight and improved mechanical properties, whilst retaining good processing properties. The invention further relates to a process for producing polyolefins using the catalyst component or catalyst system.

Metallocene catalysts have been known to be useful in the production of polyolefins for some time. The first generation of metallocene catalysts were unbridged metallocenes. These catalysts provided a new route into polyolefin resins. However, polyolefin resins produced using unbridged metallocenes were found to have poor processibility, despite having good optical properties, such as high transparency and low haze.

In order to improve the properties of the resins, bridged metallocene catalysts were developed. Such bridged metallocene catalysts are disclosed in published PCT application number WO91/03500. Typical such supported bridged metallocenes are $Et(IndH_4)_2ZrCl_2$ and $Et(Ind)_2ZrCl_2$ ($IndH_4$ is an unsubstituted tetrahydroindenyl (THI) group, and Ind is an unsubstituted indenyl group). Other such known bridged metallocenes comprise substituted cyclopentadienyl ligands, such as those disclosed in published patent U.S. Pat. No. 4,892,851. In these metallocenes, the substitution pattern was designed with a view to controlling the stereochemistry of polypropylene produced from the catalysts.

Resins produced from this second generation of metallocene catalysts display improved mechanical properties due to their higher molecular weight. In addition, such resins have better processing properties due to the presence of different chain architecture and probably long chain branches. However, the processibility and the co-monomer content of such resins is still less than is desired.

Resins produced from Ziegler-Natta and chromium-based catalysts may have the same or similar processing and mechanical properties as compared with their counterparts formed using metallocene catalysts. However, such resins display inferior optical and mechanical properties.

Thus, it is still desirable to produce high quality resins using metallocene catalysts that have more superior mechanical and processing properties.

It is an object of the present invention to overcome the problems associated with the above prior art catalysts. Accordingly, the present invention provides a catalyst component for producing a polyolefin, which catalyst component comprises a metallocene catalyst having a structure according to a formulae (I):

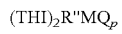  (I)

wherein each THI is a tetrahydroindenyl derivative which may be substituted or unsubstituted, provided that at least one of the tetrahydroindenyl derivatives is substituted at the 2-position and/or the 4-position; R" is a structural bridge to impart stereorigidity between the two THI groups; M is a metal from Group IIIB, IVB, VB or VIB; Q is a hydrocarbyl group having from 1–20 carbon atoms, or a halogen; and p is the valence of M minus 2. Preferably, the substituent at the 4-position is bulky, and more preferably, it is cyclic.

By substituted, in the context of the present invention it is meant that any of the positions on the tetrahydroindenyl group may comprise a substituent in place of a hydrogen atom. Thus, whilst each substituted THI group may be a tetrahydroindenyl group with the substituent present on the five-membered ring, it may alternatively be a group that comprises the same pattern of saturation as tetrahydroindenyl, but in which one or more of the hydrogen atoms on the six-membered ring has been replaced. Alternatively, and preferably, the substituents may be present on both the five-membered and the six-membered ring.

Each catalyst component comprises two THI derivative ligands. The two ligands may be different. However, it is preferred that the two THI ligands of the catalyst component are the same.

The present invention further provides a method for producing a polyolefin, which method comprises polymerising an olefin monomer (or an olefin monomer and a co-monomer) in the presence of a catalyst component (or catalyst system comprising the catalyst component) as defined above.

The substitution pattern of the THI ligands on the metallocene catalysts leads to the advantages of the present invention. The substitution pattern and numbering of the ligands of the present catalysts will be discussed in more detail below.

The ligand, THI, used in catalysts of formula (I) is a tetrahydroindenyl-type ligand, in which, in the context of the present invention, the substituent positions are numbered from 1–7 according to the system set out in the structure below:

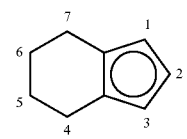

To distinguish substitution in the first THI ligand from the second, the second is numbered according to the same system, but from 1'–7', in accordance with convention. In this type of catalyst, the position of the bridge is not particularly limited, and is preferably a 1,1'-bridge, a 2,2'-bridge or a 1,2'-bridge, a 1,1'-bridge being most preferred.

The position of the substituent or substituents on the two THI ligands is not particularly limited, provided that at least one of the ligands is substituted in the 2-position and/or the 4-position. Provided that this criterion is satisfied, the THI ligands may have any substitution pattern, including being unsubstituted or fully substituted. In preferred embodiments both of the THI ligands are substituted. Typically, both of the THI ligands comprise substituents in the 2-position and/or in the 4-position. Most preferably both of the THI ligands comprise substituents in the 2-position and the 4-position. In these embodiments the other positions in the ring may also comprise substituents, or may be unsubstituted. Particularly preferred metallocene catalysts with a 1,1'-bridge have the following substitution patterns: 2; 4; 2,4; 2,2'; 4,4'; 2,4'; 2,4,2'; 2,4,4'; and 2,4,2',4' wherein only those positions indicated comprise a substituent. It should be noted that since the basic structures of both THI derivatives are identical, patterns such as 2,4' and 4,2' are identical.

The use of a catalyst as defined above (in which the THI derivatives are substituted according to the above specific substitution patterns) to produce a polyolefin, leads to polyolefins that have improved physical and mechanical properties, are easily processed and have good optical properties.

Thus, the polyolefin resins produced by the catalyst system of the present invention have improved processability and solidification properties in injection blow moulding and injection moulding, whilst simultaneously showing high transparency and flexibility.

The substituent or substituents present on the THI ligands in the above-described catalysts are not particularly limited. The above ligands, when comprising more than one substituent, may be substituted with the same substituent throughout, or with different substituents. Typically the substituents are independently selected from an aryl group and a hydrocarbyl group having from 1–20 carbon atoms. They include phenyl (Ph), benzyl (Bz), naphthyl (Naph), indenyl (Ind) and benzindenyl (BzInd), as well as Me, Et, n-Pr, i-Pr, n-Bu, t-Bu, Me$_3$Si, alkoxy (preferably R—O, where R is C$_1$–C$_{20}$ alkyl), cycloalkyl, and halogen. The most preferred substituents at the 2-position are methyl groups. The most preferred substituents at the 4-position are phenyl, naphtyl and benzindenyl.

Preferred THI derivatives include: 2-Me,4-PhTHI; 2-Me,4-NaphTHI; and 2-Me,4,5-BzIndTHI. The most preferred catalyst components comprise at least one on these ligands, and preferably two such ligands. It is particularly preferred that the two THI ligands of the catalyst components are the same.

The type of bridge present between the THI rings in the present catalyst components is not itself particularly limited. Typically R" comprises an alkylidene group having 1 to 20 carbon atoms, a germanium group (e.g. a dialkyl germanium group), a silicon group (e.g. a dialkyl silicon group), a siloxane group (e.g. a dialkyl siloxane group), an alkyl phosphine group or an amine group. Preferably, the substituent comprises a hydrocarbyl radical having at least one carbon atom to form the bridge, such as a substituted or unsubstituted ethylenyl radical (e.g. Et, —CH$_2$CH$_2$—). Most preferably R" is Et or Me$_2$Si.

The metal, M, in the metallocene catalyst is preferably a metal from Group IIIB, IVB, VB or VIB of the periodic table. Typically, M is Ti, Zr, Hf, or V and Q is preferably a halogen, typically Cl. Typically the valence of the metal is 4, such that p is 2.

The most preferred catalyst components of the present invention are:
Me$_2$Si(2-MeTHI)$_2$ZrCl$_2$
Et(2-MeTHI)$_2$ZrCl$_2$
Me$_2$Si(2-Me,4-PhTHI)$_2$ZrCl$_2$
Et(2-Me,4-PhTHI)$_2$ZrCl$_2$
Me$_2$Si(2-Me,4-NaphTHI)$_2$ZrCl$_2$
Et(2-Me,4-NaphTHI)$_2$ZrCl$_2$
Me$_2$Si(2-Me,4,5-BzIndTHI)$_2$ZrCl$_2$
Et(2-Me,4,5-BzIndTHI)$_2$ZrCl$_2$ The catalyst system of the present invention is not particularly limited provided that it comprises at least one metallocene catalyst component as defined above. Thus the system may comprise further catalysts, if necessary, such as further metallocene catalysts according to the present invention, or other catalysts.

The catalyst system of the present invention comprises, in addition to the above catalyst component, one or more co-catalysts capable of activating the metallocene catalyst. Typically, the co-catalyst comprises an aluminium- or boron-containing co-catalyst.

Suitable aluminium-containing co-catalysts comprise an alumoxane, an alkyl aluminium compound and/or a Lewis acid.

The alumoxanes that can be used in the present invention are well known and preferably comprise oligomeric linear and/or cyclic alkyl alumoxanes represented by the formula (A):

(A)

for oligomeric linear alumoxanes; and formula (B)

(B)

for oligomeric cyclic alumoxanes, wherein n is 1–40, preferably 10–20; m is 3–40, preferably 3–20; and R is a C$_1$–C$_8$ alkyl group, preferably methyl. Generally, in the preparation of alumoxanes from, for example, aluminium trimethyl and water, a mixture of linear and cyclic compounds is obtained.

Suitable boron-containing co-catalysts may comprise a triphenylcarbenium boronate, such as tetrakis-pentafluorophenyl-borato-triphenylcarbenium as described in EP-A-0427696:

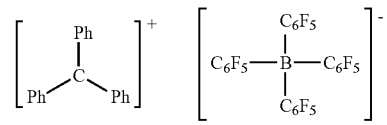

or those of the general formula below, as described in EP-A-0277004 (page 6, line 30 to page 7, line 7):

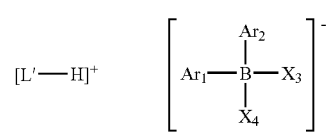

The catalyst system may be employed in the gas phase or in a solution polymerisation process, which is homogeneous, or a slurry process, which is heterogeneous in a single or tandem reactor configuration. In a solution process, typical solvents include hydrocarbons having 4–7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finely divided form.

Suitable inorganic oxide materials which are desirably employed in accordance with this invention include group IIA, IIIA, IVA, or IVB metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene.

Preferably, the support is a silica support having a surface area of from 100–1000 $m^2/g$, more preferably from 200–700 $m^2/g$, and a pore volume of from 0.5–4 ml/g, more preferably from 0.5–3 ml/g.

The amount of alumoxane and metallocenes usefully employed in the preparation of the solid support catalyst can vary over a wide range. Generally the aluminium to transition metal mole ratio is in the range between 1:1 and 100:1, preferably in the range 5:1 and 80:1 and more preferably in the range 5:1 and 50:1.

The order of addition of the catalyst and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter the catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene.

Preferably the support material is slurried in toluene and the catalyst component and alumoxane are dissolved in toluene prior to addition to the support material.

The polyolefins that the present catalyst is capable of producing are not particularly limited. It is particularly preferred that the catalyst is capable of producing polyethylene and/or polypropylene.

The catalyst component or catalyst system of the present invention are used in the method of the present invention to produce polyolefin resins. It is especially preferred that the method of the present invention is a method of producing a polyethylene or a polypropylene. These polyolefins can be monomodal or multimodal.

The conditions employed for polymerisation in the method of the present invention are not particularly limited, provided they are sufficient to effectively polymerise the particular monomeric olefin used as a starting material. When the monomer to be polymerised in the present method is ethylene, the preferred polymerisation conditions are from 70–110° C., more preferably from 70–90° C. (e.g. around 80° C.) using a hydrocarbon solvent such as isobutane or hexane. Preferably polymerisation takes place in the presence of hydrogen and an alkene co-monomer such as 1-butene or 1-hexene.

The polymerisation process in which the catalyst systems of the present invention can be used is not particularly limited. Preferably the catalysts are employed in a process for polymerising ethylene. More preferably the process is a process for producing a polyethylene with a bimodal or multimodal molecular weight distribution. Such processes may employ a dual site catalyst to achieve bimodality and one or both of the catalytic sites may be provided by metallocene catalysts as described in the present invention.

The invention will now be described in further detail by way of example only, with reference to the following non-limiting specific embodiments.

EXAMPLES

Catalyst Preparation

One catalyst component of the present invention, $(Me_2Si)$(2-MeTHI)$_2$ZrCl$_2$ (catalyst 1), was prepared in accordance with the method of W. Spalek; A. Antberg, J. Rohrmann, A. Winter, B. Bachmann, P. Kiprof, J. Behm, and W. A. Hermann, Angew. Chem. Int. Eng. Ed. 1992, 31, 1347. A further catalyst component of the present invention, (Et)(2-MeTHI)$_2$ZrCl$_2$ (catalyst 2), was prepared in accordance with the method of H. H. Brintzinger, Journal of Organometallic Chemistry, 1982, 232, 233. For comparative purposes two similar catalysts, $(Me_2Si)$(THI)$_2$ZrCl$_2$ and (Et)(THI)$_2$ZrCl$_2$ (catalysts 3 and 4 respectively) in which both THI ligands were unsubstituted, were prepared. Catalyst 4 was prepared according to F. R. W. P. Wild, M. Wasiucuinek, G. Huttner, and H. H. Brintzinger, Journal of Organometallic Chemistry, 1985, 288, 63.

The support used was silica having a total pore volume of 4.22 ml/g and a surface area of 322 $m^2/g$. This silica is further prepared by drying under a high vacuum on a schlenk line for three hours to remove physically absorbed water. 5 g of this silica were suspended in a round bottom flask equipped with a magnetic stirrer, a nitrogen inlet and a dropping funnel.

To produce activated catalyst, amounts of approximately 0.3 g of catalysts 14 were each reacted with 25 ml of methylalumoxane (MAO 30 wt. % in toluene), at a temperature of 25° C. for 10 minutes to give solutions of the corresponding metallocene cations and the anionic methylalumoxane oligomer.

Then the resulting solutions comprising the metallocene cations and the anionic methylalumoxane oligomer were added to the support under a nitrogen atmosphere via the dropping funnel, which was immediately replaced with a reflux condenser. The mixtures were each heated to 110° C. for 90 minutes. The reaction mixtures were then cooled to room temperature, filtered under nitrogen and washed with toluene.

The catalyst systems obtained were then washed with pentane and dried under a mild vacuum.

The catalyst systems of the present invention comprising catalyst components 1 and 2, and the comparative catalyst systems comprising catalyst components 3 and 4, were used to polymerise ethylene. In each polymerisation reaction, the ethylene was polymerised in a 4 l bench reactor at 80° C. An isobutane solvent (2 l) was used comprising 6% wt. ethylene. A 1 hr residence time was used. The molecular weight (Mw) of the polymer products produced as well as their HLMI values are shown below in Table 1.

TABLE 1

| Cat. & bridge | Substituted (invention) | | Unsubstituted (comparison) | |
|---|---|---|---|---|
| | Catalyst 1 (Si) | Catalyst 2 (Et) | Catalyst 3 (Si) | Catalyst 4 (Et) |
| $M_w$/kDa | 399 | 360 | 329 | 326 |
| HLMI (g/10 mins) | 0.15 | 0.22 | 0.27 | 0.22 |

Comparing the properties of the polyethylene products produced by the third generation catalysts (substituted catalysts of the present invention) with the closest second generation catalysts (unsubstituted), it is clear that the catalysts of the present invention give a much higher molecular weight product than the comparative catalysts whilst displaying a similar or reduced HLMI. This is particularly demonstrated by the $M_w$ and HLMI values for catalyst 1 which are 399 k and 0.15 respectively, the highest and lowest values for the tested polymers. It is preferable that the molecular weight is as high as possible to benefit the mechanical properties of the polymer produced.

The HLMI measured in the above Examples is the high load melt index and is measured according to the procedures of ASTM D 1238 using a load of 21.6 kg at a temperature of 190° C.

The invention claimed is:

1. A catalyst component comprising a metallocene compound having a structure defined by the formula:

$$(THI)_2R''MQ_p \qquad (1)$$

wherein each THI is a tetrahydroindenyl group and at least one of the THI groups is substituted at the 2- and the 4-position, the substituent at the 4-position having a greater bulk than that or the substituent at the 2-position, R" is a 1.1'-ethylidene or 1.2'-ethylidene structural bridge extending between the two THI groups, M is a metal selected from Group IIIB, IVB, VB or VIB metals, Q is selected from hydrocarbyl groups having from 1 to 20 carbon atoms, halogen atoms or combinations thereof and p is the valence of M minus 2 wherein the catalyst component is a heterogenous catalyst component.

2. The catalyst compound of claim 1, wherein both of the THI groups are substituted.

3. A catalyst component according to claim 2, wherein both of the THI groups have the same pattern of substitution.

4. A catalyst component according to claim 1, wherein the substituents on the THI groups are independently selected from Ph, Bz, Naph, Ind, BzInd, Me, Et, n-Pr, I-Pr, n-Bu, t-Bu, or Me$_3$Si.

5. A catalyst component according to claim 4, wherein the substituents comprise methyl groups at the 2-position an a member selected from phenyl groups at the 4-position naphthyl groups at the 4-position, or benzindenyl groups at the 4,5-position.

6. A catalyst component according to claim 1, wherein M is Ti, Zr, Hf, or V.

7. A catalyst component according to claim 6, wherein Q is Cl.

8. A catalyst component according to claim 7, wherein p is 2.

9. A catalyst component according to claim 1, wherein the metallocene compound is immobilized on a solid support.

10. A catalyst system comprising a catalyst component as defined in claim 1, and further comprising an aluminum- or boron-containing co-catalyst.

11. A process for producing a polyolefin comprising:
providing a catalyst system comprising a metallocene catalyst component having a structure defined by the formula:

$$(THI)_2R''MQ_p \qquad (1)$$

wherein each THI is a tetrahydroindenyl group and each one of the THI groups is substituted at the 2- and the 4-position, the substituent at the 4-position having a greater bulk than that of the substituent at the 2-position, R" is a 1.1'-ethylidene or 1.2'-ethylidene structural bridge extending between the two THI groups, M is a metal selected from Group IIIB, IVB, VB or VIB metals, Q is selected from hydrocarbyl groups having from 1 to 20 carbon atoms, halogen atoms or combinations thereof and p is the valence of M minus 2 wherein the catalyst component is a heterogenous catalyst component, and an aluminum- or boron-containing co-catalyst that activates the catalyst component, wherein the catalyst system is adapted to provide heterogenous polymerization;
contacting the catalyst system with an olefin monomer in a polymerization reaction zone under polymerization conditions to form a polyolefin product; and
withdrawing said polyolefin product from said polymerization reaction zone.

12. A process for producing a polyolefin comprising:
providing a catalyst system comprising a metallocene catalyst component having a structure defined by the formula:

$$(THI)_2R''MQ_p \qquad (1)$$

wherein each THI is a tetrahydroindenyl group and each one of the THI groups is substituted at the 2- and the 4-position, the substituent at the 4-position having a greater bulk than that of the substituent at the 2-position and wherein both of the THI groups have the same pattern of substitution, R" is a 1.1'-ethylidene or 1.2'-ethylidene structural bridge extending between the two THI groups, M is a metal selected from Group IIIB, IVB, VB or VIB metals, Q is selected from hydrocarbyl groups having from 1 to 20 carbon atoms, halogen atoms or combinations thereof and p is the valence of M minus 2 wherein the catalyst component heterogenous catalyst component, and an aluminum- or boron-containing co-catalyst that activates the catalyst component;
contacting the catalyst system with an olefin monomer in a polymerization reaction zone under polymerization conditions to form a polyolefin product; and
withdrawing said polyolefin product from said polymerization reaction zone.

13. The process of claim 12, wherein said metallocene catalyst is immobilized on a solid support.

14. A process according to claim 12, wherein the olefin monomer is ethylene or propylene and said polyolefin product is polyethylene or polypropylene.

15. A process according to claim 14 wherein said catalyst system comprises a second metallocene catalyst component as defined by formula (1) to provide a dual site catalyst system and wherein said polyolefin product comprises a multimodal polyolefin.

16. The process of claim 15 wherein said olefin monomer is ethylene and said polyolefin product is multimodal polyethylene.

* * * * *